Jan. 9, 1962 D. M. SKIDMORE 3,016,530
RADAR OBJECT POSITIONAL INDICATOR
Filed Nov. 14, 1946
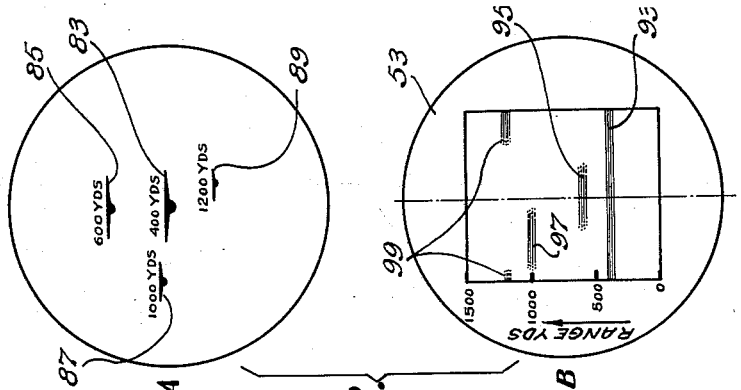
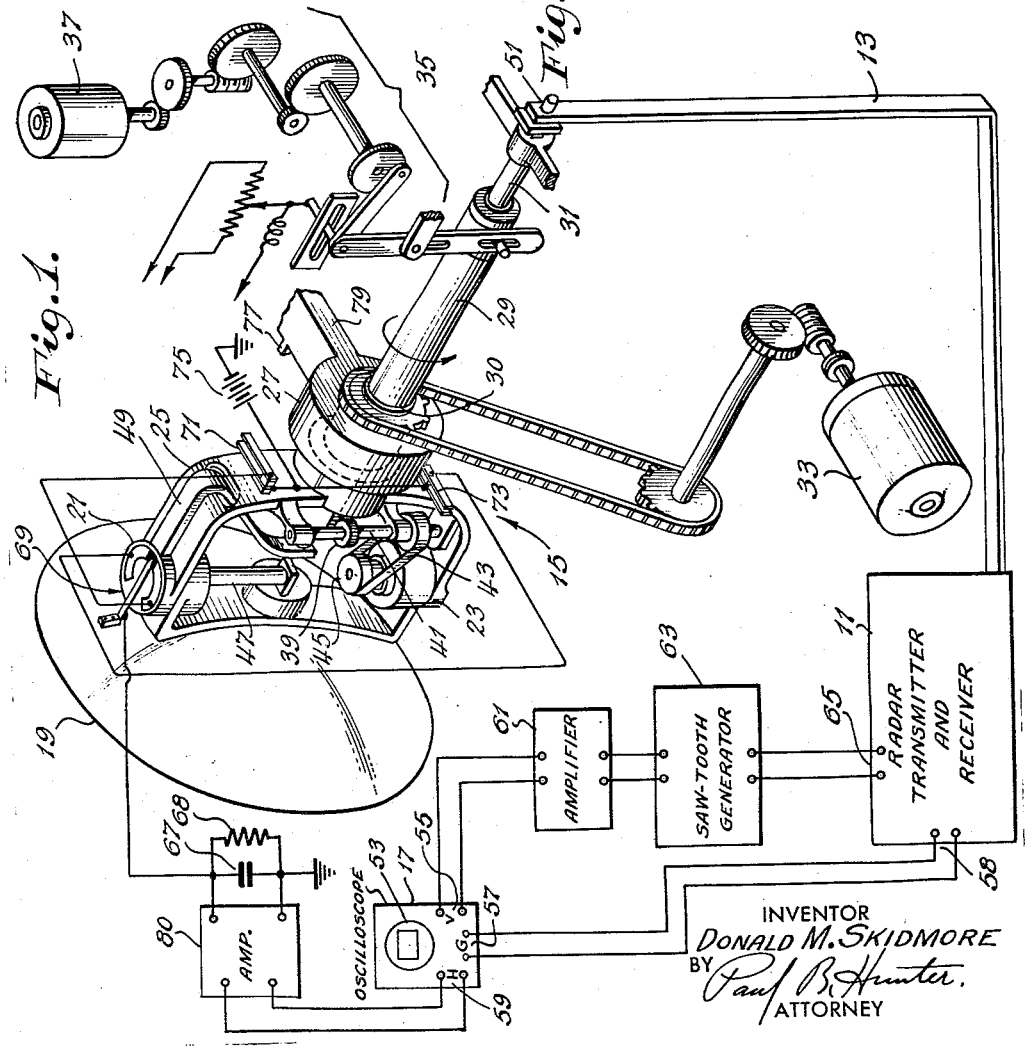
INVENTOR
DONALD M. SKIDMORE
BY
Paul B. Hunter
ATTORNEY

United States Patent Office 3,016,530
Patented Jan. 9, 1962

3,016,530
RADAR OBJECT POSITIONAL INDICATOR
Donald M. Skidmore, Farmingdale, N.Y., assignor to Sperry Rand Corporation, a corporation of Delaware
Filed Nov. 14, 1946, Ser. No. 709,853
6 Claims. (Cl. 343—11)

The present invention relates to apparatus and systems for presentation of an information pattern providing data as to the operation of electrical systems, and is particularly concerned with a system suitable for portraying a pattern which conveniently and unambiguously indicates the performance of a radio system such as a radar system or radio object detection system.

Radio transmitting and receiving systems have been arranged in various forms for determination of the direction of a remote object according to the direction of aiming of a directionally selection antenna, and for determination of the distance of the object according to the propagation time required for transmitted radio energy to go to the object and for the energy reflected back by the object to return therefrom. A radar system in one well known form employs an ultra-high frequency radio pulse transmitter and an ultra-high frequency receiver, the pulse transmitter being employed for the recurrent production of high power, ultra-high frequency energy pulses, and the receiver being employed to receive the relatively weak energy pulses which are reflected back from a distant object upon which the transmitted energy impinges. Ordinarily the directive antenna which cooperates with either the transmitter or the receiver, or with both the transmitter and the receiver, is arranged for a very confined directivity pattern such as that enclosed by a cone of the order of 3 to 5 degrees. The antenna usually is periodically moved or scanned throughout a wide directional range, as through a conical range of a cone angle which may be twice as great as the cone angle defining the antenna pattern extent.

The location of remote objects, in terms of distance and direction, may be portrayed upon an indicating apparatus coupled to the radar transmitter and receiver units and to the antenna scanning unit. Such indicating apparatus usually incorporates an oscilloscope or related apparatus. The oscilloscope may include cathode ray beam generation and intensity control elements and beam deflection arrangements. Heretofore, such indicators have been employed for azimuthal search indicators, the oscilloscope beam being deflected horizontally through an appreciable extent synchronously with the horizontal or azimuthal scanning of the radar directive antenna, and being recurrently deflected vertically at substantially uniform speed in synchronism with the production of the recurrent radio pulses by the transmitter. With such an arrangement, the height of the deflectable beam at an instant of reflected pulse reception represents the distance of the object from which the energy pulse was reflected. The cathode ray beam intensity is controlled according to the output signals produced by the radar receiver, so that a distinctive mark is produced on the indicator screen at a height representing the distance of the energy reflecting object and at an azimuthal position on the screen representing the azimuthal direction of the object.

Such indicator arrangements are satisfactorily employed where it is unnecessary to provide the operator with information as to the elevation component of direction of the detected object. Where this latter information also is needed, however, the above described indicator is inadequate. The data presentation problem here becomes three-dimensional, rather than two-dimensional, and appears as a difficult problem to solve.

An objective of the present invention is to provide an improved data presentation system, and a particular object is to provide a simple data presentation system suitable for incorporation in radar equipment and for portraying full and unambiguous information as to the location of a detected object. More particularly, an objective of the present invention is the provision of an indicator wherein a two-dimensional data pattern is made to portray information representing the position of a detected object in terms of three dimensions, i.e., in terms of distance to the object, the azimuthal component of object direction, and the elevation component of the object direction.

In accordance with an important feature of the present invention, a detected object is represented by a linear pattern displaced from a base line by a dimension representing the distance to the represented object, and graduated in intensity in such a way as to represent divergence of the object to the right or left, or up or down from a normal or forward direction. This line, which preferably is a horizontal luminous line formed on the fluorescent screen of a cathode ray oscilloscope, has its outer portions or ends differentially illuminated or intensified according to the azimuthal divergence of the direction to the detected object, and the intensity or distinctness of the middle portion is differentially controlled relative to that of the outer portions according to the elevation component of divergence of the direction to the detected object. In a preferred form of the invention, a horizontal trace is provided on the oscilloscope at a height above a pattern base line representing target distance, and the side of the pattern toward which the object direction diverges is given superior illumination. Furthermore, as the object direction diverges upward from a forwardly extending direction, the middle portion of the line is given superior illumination, while a divergence downward brings about superior intensity of the outer portions of the line and reduced illumination of the middle portion, or extinction thereof. A full horizontal line pattern indicates that the represented object is directly ahead.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

The foregoing objectives and features of the present invention will be more readily understood and other objectives will be apparent from the following description of selected embodiments of the present invention, considered in relation to the accompanying drawings, wherein:

FIG. 1 represents a preferred embodiment of the present invention, showing the mechanical features of a radar scanning system in perspective, and schematically indicating the remaining portions of the radar system; and FIG. 2 shows the manner in which the present invention represents targets at various distances and in various directions.

In FIG. 1 there is shown a complete radar system including a radar pulse transmitter and receiver unit 11 coupled through a wave guide 13 to a motor driven directive antenna system 15 arranged for periodical scanning throughout a selected range of directions. An oscilloscope 17 is coupled to the radar transmitter-receiver combination unit 11 and also to the directive antenna system 15, and so arranged as to give indications of distance and direction of objects intercepting transmitted radar pulse energy and reflecting part of the energy back to the antenna system 15 to actuate the receiver section of unit 11.

The directive antenna and scanning system 15 is of the type shown and claimed in patent application S.N.

656,226 filed March 22, 1946, by Bergey et al., now U.S. Patent No. 2,908,607. This system comprises a directive antenna 19 including a paraboidal reflector and an exciter element positioned in the focal region thereof. The antenna 19 is pivotally supported in journals 21 and 23 in a yoke 25 for freedom about an axis perpendicular to the antenna directive axis. The yoke 25 is in turn pivotally supported in a bearing system 27 for rotation about an axis perpendicular to the axis of bearings 21, 23, the axis of bearing system 27 being aligned ordinarily parallel to the longitudinal axis of the craft. Coaxial sleeve 29 longitudinally slidable within the rearward tubular extension 30 of the yoke 25 is rotated along with the yoke by the action of an antenna spin motor 33, and is given relative reciprocal movement by the action of a translatory drive linkage 35 coupled to a translatory drive motor 37. The sleeve 29 extends into the region between the arms of yoke 25, and in this region a rack formed upon the end of the sleeve 29 engages a pinion 39 coupled through a shaft 41 and a belt 43 to a pulley 45 fixed to the directive antenna 19. Through this linkage, reciprocal translatory movement of the sleeve 29 caused by the operation of motor 37 effects oscillatory movement or "nodding" of the antenna 19 about the axis of journals 21, 23.

With this arrangement, the rotation of the antenna system about the axis of the bearing 27 by the motor 33 causes the scanning of the directive axis of antenna 19 through a conical locus characterized by a cone angle determined according to the longitudinal position of sleeve 29. If the motor 37 operates during the rotation of the antenna 19 by the motor 33, then the antenna is periodically nodded about the axis of bearings 21 and 23 from a first nod angle extreme through the neutral position of alignment of the axis of antenna 19 with the axis of bearing 27, to the opposite nod angle extreme, and similarly back through a neutral position to the starting point, this performance being cyclically repeated. As a result, the directive axis of the antenna 19 is scanned or swept throughout a locus bounded by a cone having a cone angle equal to twice the maximum nod angle between antenna 19 and bearing 27.

The antenna 19 is coupled to the wave guide 13 through a first transmission line section 47 fixed to the antenna, a second transmission line section such as a wave guide 49 coupled to the upper end of the transmission line section 47 in the region of bearing 21, the opposite end of the transmission line section 44 being coupled to a further transmission line section formed with a tubular member 31 in sleeve 29 and coupled at its rearmost end to the wave guide 13 in a joint 51. If desired, transmission line section 47 and the section enclosed within the tubular member 31 may comprise coaxial transmission lines having their inner conductors extending into the ends of wave guide 49 and the end of wave guide 13. With such arrangements, relative rotation is permitted at the joint 51 and at the joint between transmission line sections 47 and 49, in accordance with well known ultra-high frequency energy transmission techniques.

The oscilloscope 17 may include a cathode ray tube 53 presenting a fluorescent screen area for view by the pilot of the aircraft upon which the radar system is employed for tactical purposes. Oscilloscope 53 includes a first pair of terminals 55 for application of vertical sweep voltage, a second pair of terminals 57 for application of intensity control voltage, and a third pair of terminals 59 for receiving horizontal sweep voltage. The terminal pair 57 is connected to the receiver output terminals 58 of the unit 11 for control of the cathode ray beam intensity in such a way as to provide momentary illumination of the fluorescent screen at the instant of reception of a reflected radar energy pulse. The vertical sweep terminals 55 are coupled through an amplifier 61 to a sawtooth wave generator 63, which is coupled to the radar transmitter pulse timing terminals 65 of the unit 11 for synchronization of the linear time sweep of oscilloscope 17 with the transmission of the radar pulses. Through this arrangement, the height of the cathode ray beam at the instant of illumination of the fluorescent screen is varied in proportion to the time elapsed after the transmission of a radar energy pulse, and hence in proportion to the range or distance of the energy reflecting object.

In accordance with an important feature of the present invention, the cathode ray beam is swept horizontally by a periodical sawtooth sweep wave so synchronized with the rotation of the antenna 19 that the cathode ray beam starts from maximum deflection to the right when the antenna 12 is aimed in its lowermost direction, the cathode ray beam travelling to the middle of the oscilloscope screen substantially linearly with rotation of the antenna 11 up to the uppermost aiming direction, and the cathode ray beam continuing to its opposite deflection extreme (i.e., to maximum deflection to the left) linearly as the antenna rotates onward to its lowermost aiming extreme. As the antenna reaches its lowermost extreme, the cathode ray beam is returned almost instantaneously to the opposite side of the fluorescent screen and the next linear movement commences in synchronism with the next cycle of rotation of the antenna 19.

The above outlined operation is effected through the use of a capacitance-resistance voltage discharge circuit 67, 68 connected to a circuit including switches 69, 71 and 73 and a voltage source 75. Switch 69 is a single-pole, double-throw switch arranged to select one of the timing switches 71 and 73, the selection being dependent upon the direction of nod deflection of the antenna 19. Switches 71 and 73 are arranged to be momentarily actuated by a projection 77 on the member 79 in which the antenna spin bearing system 27 is installed. Whichever of the instantaneous pulse switches 71, 73 is connected through the single-pole double-throw switch 69 to the discharge circuit 67 during a series of revolutions of the antenna is operated momentarily during each cycle or revolution, at the instant when the antenna 19 is aimed at its downward extreme, to provide an almost instantaneous charge of the capacitance 67 by energy supplied from the low resistance source 75. At each of the moments of contact of the instantaneous charging switch connected through selector switch 69, the voltage across the capacitor 67 rises substantially to the voltage of the source 75. Then, during the cycle of rotation of antenna 19, and until the instantaneous contact switch is again actuated by the projection 77, the capacitor 67 discharges through resistor 68 so that the voltage thereacross is reduced during each revolution of the antenna from the voltage of source 75 to a voltage which may be of the order of 80% to 90% of the source voltage. Thus, the desired sawtooth horizontal sweep voltage wave form is achieved at the input terminals of amplifier 80, and is substantially reproduced at the horizontal sweep terminals 59 of the oscilloscope 17.

The instantaneous charging switches 71 and 73 are fixed to the yoke 25 at positions 180° apart. The selector switch 69 operates to select one or the other of these switches 71 and 73, according to the direction of nod of the antenna 19 about the axis of bearings 21, 23. Switch 69 changes the charging circuit over from one of switches 71 and 73 to the other as the antenna axis passes through parallel with the axis of bearing 27, so that the charging impulses affecting capacitor 67 can only occur at the passage of antenna 19 through the point of lowermost aiming in its cycle of revolution, regardless of the direction of nod deflection.

The resulting operation of the oscilloscope 17 is best described by reference to illustrative oscilloscope patterns, as shown in FIG. 2B, considered there in relation to the directions and distances of objects or targets such as aircraft. The configuration shown in FIG. 2A corresponds to the view of these objects as seen through an optical sighting system aligned parallel with the axis of the craft upon which the radar system is employed. In this view an aircraft 83 is seen directly ahead at a distance of 400 yards; and a second aircraft 85 is at a distance of 600 yards and at an angle of elevation above the direction of flight of the craft bearing the radar system. A third aircraft 87 is seen at a distance of 1000 yards and in a direction appreciably to the left of the straight-ahead direction, while a fourth aircraft 89 is shown at a distance of 1200 yards, in a direction appreciably downward and slightly to the right.

These craft are represented on the screen of the oscilloscope 53 shown in FIG. 2B, by the respective images 93, 95, 97 and 99. The image 93 representing object 83 appears at a height in the presentation area corresponding to the target distance of 400 yards, and this image is formed as a full line extending entirely across the rectangular presentation area. Where such a full line appears, it conveys to the operator the information that the intercepted object is directly ahead.

The fullness of the line 93 results from the fact that for any nod angle, the antenna is aimed at a substantially constant angle of divergence from the direction of the target irrespective of the angle of revolution of the antenna. Hence, all of the several pulses of radar energy transmitted during a revolution of the antenna 19 are equally effective upon the detected object, and so all of the reflected energy pulses are equally effective upon the radar receiver and hence upon the intensity control terminals 57 of the oscilloscope 17. Where an energy reflecting object is above the forward direction, maximum effectiveness upon the radar receiver and the oscilloscope intensity control terminals 57 results during the upper part of the revolution of the antenna 19, and hence during the middle part of the horizontal sweep cycle. Accordingly, the image appears as at 95 for a target 85 which is above the line forming an extension of the aircraft axis.

A target which is below the aircraft axis, e.g. target 89, produces an image which is energized at its ends and suppressed at the middle, the middle portion of the image being entirely erased if the object direction is appreciably below the forward direction. This is illustrated at 99, where the inequality of the left-hand and right-hand portions of the image is of such nature as to indicate that the target is displaced not only appreciably downward but also somewhat to the right. The image 97, appearing at a height corresponding to 1000 yards and appearing only in the left-hand portion of the representation area, indicates that target 87 is displaced appreciably to the left from the forward direction. Thus, the present invention gives two-dimensional indications of the positions of aircraft or other indicated objects, in such a way that the operator is enabled to determine their position by a simple and easily learned interpretation of the object pattern, the positions of the objects being given in terms of three dimensions.

Where the invention is employed for military purposes, an operator maneuvers his craft in such a way as to obtain a pattern similar to pattern 93, indicating that an intercepted craft is directly ahead so that the guns of the operator's fighter craft are aimed toward the detected craft. It will be apparent that the present invention, affording a very clear type of indication free from ambiguity as to the positions of aircraft, and being capable of showing a large number of aircraft at various distances, is suited for air traffic control applications and other peacetime uses as well as for military purposes.

Moreover, the uses of the present invention are not restricted to representation of aircraft. It provides readily interpretable patterns representing the terrain ahead, and fixed or movable obstructions. It provides illuminated areas in the lower corners and sides of the pattern when borne in an aircraft and forwardly aimed while the aircraft is in level flight over land or sea. In such a pattern, a ship upon the sea, or a tank or other vehicle upon level ground, or a projection of the terrain, is readily distinguishable as to distance and direction. Hence, the presentation afforded can be used as readily for reference for flying an aircraft toward a ship, e.g. in divebombing, as for flying it toward another aircraft. With a ship as the target, the full straight line pattern across the presentation area indicates progress directly toward the target.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A recurrent pulse radar object detection system comprising a directive conical scan antenna, a cathode ray indicator, means for sweeping the cathode ray beam in a vertical direction synchronously with the transmitted pulses of said radar and for deflecting said cathode ray beam in the horizontal direction from one side to the opposite side synchronously with the angular progress of said antenna from the down reference point on its conical scan locus, and means including a radar receiver having an output circuit coupled to the beam control circuit of said cathode ray indicator for changing the intensity of the cathode ray beam according to the distance and relative direction of the radar targets, whereby low targets are presented at the extremities, and high targets are presented in the middle of the horizontal trace, the height of the horizontal trace on the indicator corresponding to the distance of the object.

2. A cathode ray indicator for a conical scan recurrent pulse radio object distance and direction determining system including a conical scanning antenna, comprising means to sweep the beam of said cathode ray indicator vertically proportionally to the elapsed time after each transmitted pulse, and means to sweep said cathode ray beam horizontally in synchronism with the conical rotation of the scanning antenna to define a substantially rectangular scan raster, said last-named means comprising means generating recurrent saw-tooth sweep waves for sweeping said beam progressively in a first horizontal direction from one border of the scan raster toward the opposite border thereof at a predetermined rate and substantially instantaneously returning said beam to said one border of the scan raster, and means for synchronizing said recurrent saw-tooth sweep waves with the successive rotations of said scanning antenna, whereby the horizontal presentation is a straight line projection of the circular scan motion.

3. A system for producing an information pattern representing the distance and direction of an object, comprising a data pattern screen, means for providing thereon a luminous horizontal linear pattern representing the object, said pattern being parallel to a selected base line on said screen, means for varying the distance between said base line and said pattern according to the distance to said object, and means for rendering the left or right portions of said pattern brighter than the opposite portion accordingly as the object direction is to the left or to the right of the forward direction and for rendering the middle portion of said pattern or the outer portions thereof brighter accordingly as the object direction is above or below the forward direction.

4. Directional radio apparatus comprising a directive antenna defining an axis of directivity, means pivotally supporting said antenna for rotational freedom about a first support axis substantially perpendicular to said axis of directivity, said pivotal supporting means being journalled for rotation about a second support axis substantially perpendicular to said first support axis, means for revolving said antenna and said supporting means about said second support axis and for oscillating said antenna about said first support axis through a direction of parallelism of said directive axis with said second support axis, radio receiving means cooperating with said antenna for providing target echo signals, an oscilloscope arranged for beam deflection and intensity control, said oscilloscope being coupled to said radio receiving means for intensity variation in accordance with the variations of said signals, means for sweeping said oscilloscope beam unidirectionally synchronously with the revolutions of said antenna about said second support axis, said sweeping means being arranged to sweep said beam unidirectionally substantially throughout each revolution of said antenna about said second support axis and to return said beam abruptly for a further unidirectional sweep during the next succeeding revolution, and means for shifting the phase of said sweeping means by a 180° phase shift relative to the revolution of said antenna about said second axis when said antenna passes through said direction of parallelism.

5. Indicating apparatus for presenting a linear pattern representing the position of an object according to the direction of aiming of a directive antenna cyclically scanned through a regular course of directions, the scanning involving continuous rotation in a uniform direction about a predetermined scan axis, comprising presentation means arranged for production and intensity control of a deflectable pattern-generating beam, means synchronized with the scanning of said antenna about said predetermined scan axis for deflecting said beam in a predetermined direction from one limit thereof to the opposite limit thereof during each revolution of the direction of aiming of said directive antenna about said predetermined scan axis, the beam being swept progressively in said direction substantially throughout each cycle of movement of the antenna about said predetermined scan axis and being returned to said one limit substantially instantaneously for a further sweep, and means for varying the intensity of said beam in accordance with variations of strength of radio signals resulting from the cyclical antenna directional variations, said apparatus further including means for deflecting said beam transversely of said predetermined direction by an extent proportional to the distance of the object.

6. A system for producing an information pattern representing the direction of an object, comprising a data pattern presentation device, means for providing thereon a linear pattern for representing the object direction, said linear pattern being of maximum length and uniformity when the object direction coincides with a preferred direction, means for producing a contrast between the outer parts of said pattern accordingly as the object direction diverges from said preferred direction in a first plane and for producing a contrast between the middle and the ends of said pattern accordingly as the object direction diverges from said preferred direction transversely to said first plane.

References Cited in the file of this patent
UNITED STATES PATENTS

| | | |
|---|---|---|
| 2,083,242 | Runge | June 8, 1937 |
| 2,189,549 | Hershberger | Feb. 6, 1940 |
| 2,401,432 | Luck | June 4, 1946 |
| 2,406,358 | Doba | Aug. 27, 1946 |
| 2,412,702 | Wolff | Dec. 17, 1946 |
| 2,412,703 | Wolff | Dec. 17, 1946 |
| 2,419,205 | Feldman | Apr. 22, 1947 |
| 2,419,239 | White | Apr. 22, 1947 |
| 2,421,747 | Engelhardt | June 10, 1947 |
| 2,423,104 | Labin | July 1, 1947 |
| 2,424,984 | Hoffman | Aug. 5, 1947 |
| 2,426,218 | Hopgood | Aug. 26, 1947 |
| 2,427,905 | Fyler | Sept. 23, 1947 |
| 2,446,024 | Porter | July 27, 1948 |
| 2,449,976 | Busignies | Sept. 29, 1948 |
| 2,459,481 | Wolff | Jan. 18, 1949 |
| 2,459,482 | Bond | Jan. 18, 1949 |
| 2,470,939 | Miller | May 24, 1949 |
| 2,471,264 | Doherty | May 24, 1949 |
| 2,495,753 | Mozley | Jan. 31, 1950 |
| 2,500,552 | Lindenblad | Mar. 14, 1950 |